United States Patent [19]
Hall et al.

[11] Patent Number: 5,356,167
[45] Date of Patent: Oct. 18, 1994

[54] TRAILER HITCH WITH MULTI-DIRECTIONAL PIVOT

[76] Inventors: Arthur E. Hall, P.O. Box 452, Libby, Mont. 59923; Arthur T. Hall, P.O. Box 494, Colstrip, Mont. 59323

[21] Appl. No.: 95,165

[22] Filed: Jul. 20, 1993

[51] Int. Cl.$^5$ .......................... B60D 1/01; B60D 1/48
[52] U.S. Cl. .................. 280/492; 280/433; 280/901
[58] Field of Search ........... 280/433, 437, 438, 901, 280/492, 423.1, 439, 440

[56] References Cited

U.S. PATENT DOCUMENTS

| | | | |
|---|---|---|---|
| 974,877 | 11/1910 | Greene | 280/438.1 |
| 2,618,488 | 11/1952 | Ketel | 280/433 |
| 2,648,544 | 8/1953 | Kayler | 280/440 |
| 3,164,398 | 1/1965 | Lugash | 280/423 |
| 3,164,399 | 1/1965 | Lugash | 280/423 |
| 3,390,896 | 7/1968 | Philapy | 280/438.1 |
| 3,392,992 | 7/1968 | Baker et al. | 280/423 |
| 3,811,706 | 5/1974 | Tucker et al. | 280/407 |
| 3,843,161 | 10/1974 | Hastings | 280/423 |
| 3,874,702 | 4/1975 | Hall | 280/423 |
| 3,893,711 | 7/1975 | Goodwin | 280/423 |
| 4,017,095 | 4/1977 | Best | 280/438.1 |
| 4,327,934 | 5/1982 | Karnes | 280/423 R |
| 4,721,323 | 1/1988 | Czuk et al. | 280/433 |
| 4,824,134 | 4/1989 | Harris | 280/438.1 |
| 4,960,288 | 10/1990 | Chambers | 280/423.1 |

OTHER PUBLICATIONS

Super 5th brochure.
Excerpts showing misc. Fifth Wheel Hitches.

Primary Examiner—Margaret A. Focarino
Assistant Examiner—Kevin Hurley
Attorney, Agent, or Firm—Wells, St. John, Roberts, Gregory & Matkin

[57] ABSTRACT

A trailer hitch includes a support structure having spaced end mounting brackets and a U-shaped cross member pivotally mounted to, and suspended between, the mounting brackets. The U-shaped cross member pivots about a first axis. The trailer hitch also includes a coupling subassembly pivotally mounted to a mid-section of the U-shaped cross member to pivot about a second axis that is substantially perpendicular to the first axis.

11 Claims, 3 Drawing Sheets

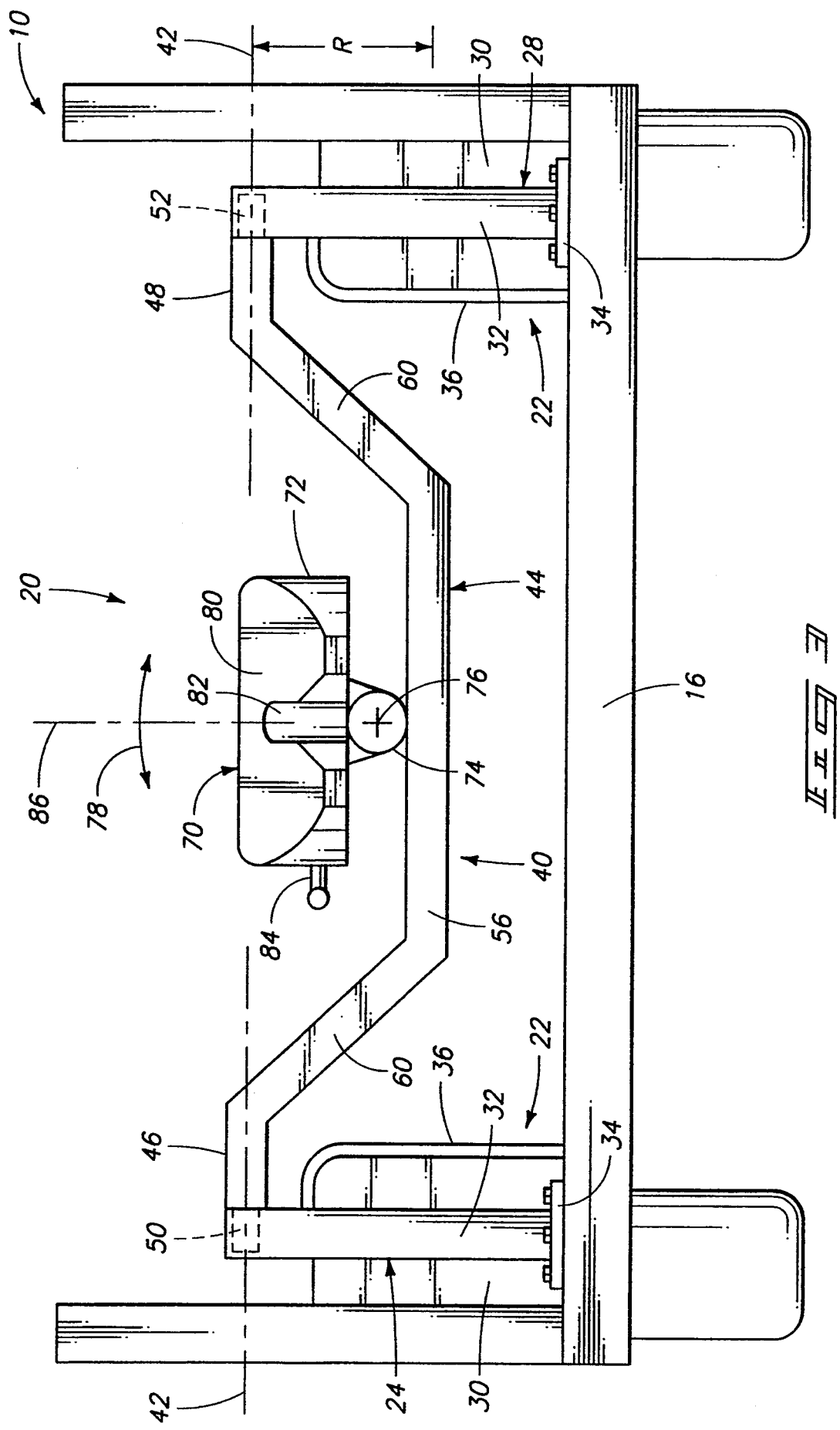

TRAILER HITCH WITH MULTI-DIRECTIONAL PIVOT

TECHNICAL FIELD

This invention relates to trailer hitches having multi-directional pivoting capabilities for use with recreational trailers.

BACKGROUND OF THE INVENTION

Trailer hitches are used to couple a powerless vehicle to a powered vehicle for purposes of towing. Commonly known powerless vehicles include recreational "fifth-wheel" trailers and semi-truck trailers. These powerless vehicles are pulled by powered vehicles such as pickup trucks, flatbed trucks, semi-trucks, and the like.

Trailer hitches are typically mounted to the powered vehicles and designed to receive a complementary tow member provided on the towed vehicle. In the context of fifth-wheel trailer hitches, the hitch has a clamping mechanism for receiving and clamping onto a towing pin mounted on the nose of a fifth-wheel trailer. This arrangement allows the fifth-wheel trailer to pivot about its towing pin to facilitate guidance of the trailer around corners and during parking.

Common fifth-wheel trailer hitches have a support unit that is fixedly mounted to a truck. The clamping mechanism is pivotally connected to the support unit to pivot about a single axis that is parallel to an axis defined by the rear wheel axles of the truck. In this manner, the trailer can move up and down relative to the truck when driving over hills and gullies. However, under some circumstances, the fifth-wheel hitches are difficult to operate because they only pivot about the one axis. For example, when the trailer is not level with the truck, but is tilted slightly relative thereto (e.g., due to uneven ground), it is often difficult if not impossible to disconnect the towing pin from the jaws of the unidirectional pivoting hitch because the pin is not properly oriented within the clamping mechanism. Common hitches simply do not yield or pivot to compensate for the improper pin orientation caused by the uneven tilt.

This invention provides a trailer hitch that has multi-directional pivoting capabilities.

BRIEF DESCRIPTION OF THE DRAWINGS

Preferred forms of the invention are described herein with reference to the accompanying drawings. Like reference numerals used throughout the figures represent substantially similar or identical parts or components. The drawings are briefly described below.

FIG. 3 is a longitudinal side view of the FIG. 2 trailer hitch.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
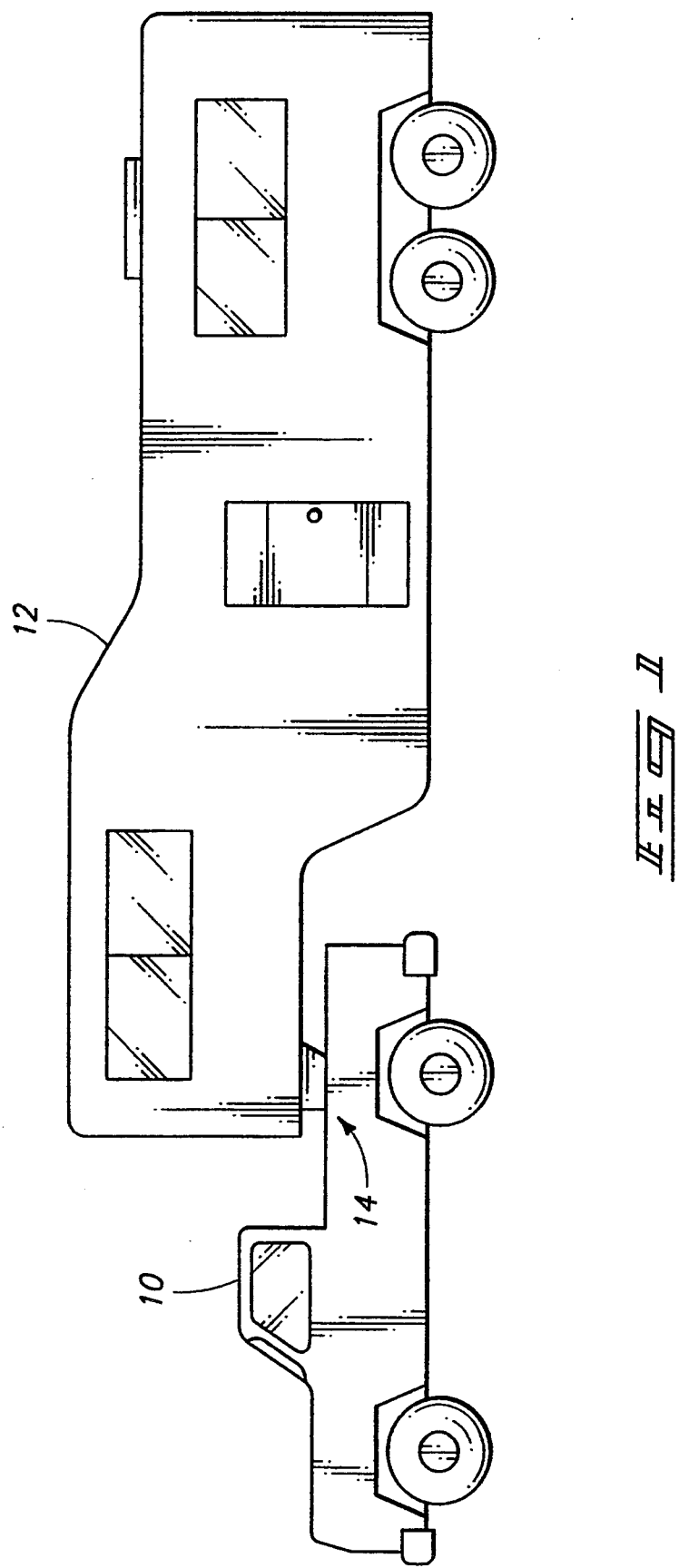
FIG. 1 is a diagrammatic illustration of a pickup truck towing a fifth-wheel trailer.

FIG. 1 shows a powered vehicle 10 embodied as a pickup truck towing a powerless vehicle 12 in the form of a fifth-wheel trailer. The trailer is coupled to the truck via a trailer hitch 14 according to this invention. The trailer hitch 14 is mounted to the bed 16 of pickup truck 10. Other powered and powerless vehicles can be used within the context of this invention, but the trailer hitch of this invention is preferably adapted for use with a pickup truck and a fifth-wheel trailer.

Figure 2:
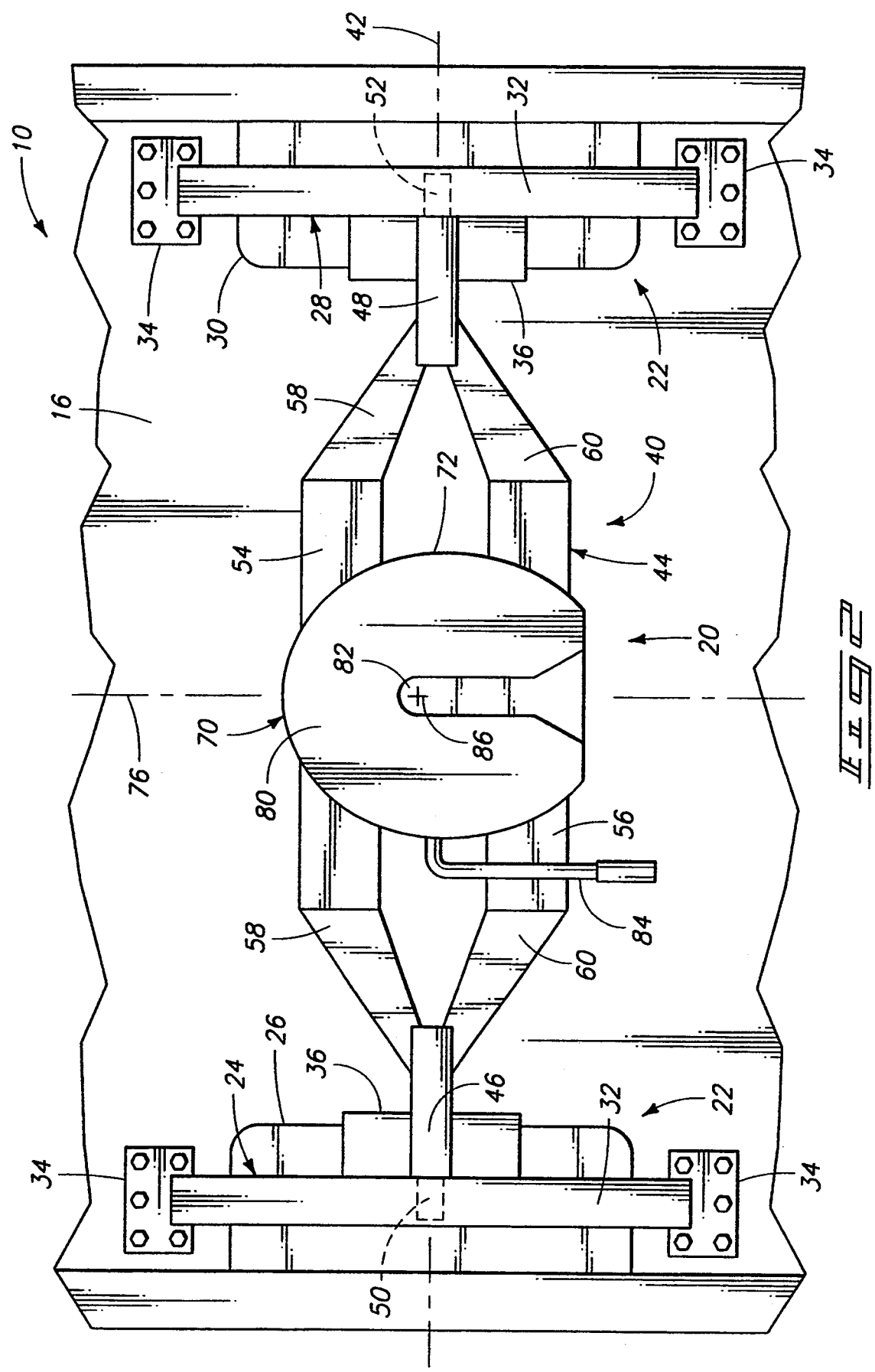
FIG. 2 is a top plan view of a trailer hitch according to a preferred embodiment of this invention.

FIGS. 2 and 3 show a fifth-wheel trailer hitch 20 according to a preferred embodiment of this invention. Trailer hitch 20 has a support structure 22 that is fixedly mounted to truck bed 16. There are two general types of support structures: rail supports and pedestal supports. A rail support is connected on opposing sides of the truck bed along the rails of the pickup truck. A pedestal support is mounted to the central portion of the pickup bed. Rail supports have the benefit that most of the truck bed remains available for storage, whereas pedestal supports consume a major portion of the truck bed, thereby limiting the available storage space. Aspects of this invention can be used with the pedestal support, but the support structure of the preferred embodiment is a "rail"-type support.

Support structure 22 includes a first or left end mounting bracket 24 positioned over in bridging fashion an associated left wheel well 26 of truck bed 16 and a second or right end mounting bracket 28 positioned over in bridging fashion an associated right wheel well 30. Mounting brackets 24 and 28 are spaced apart from one another and aligned along the opposing railings of pickup truck 10. Individual mounting brackets 24 and 28 have a primary yoke or leg 32, two fastening plates 34 on opposing ends of leg 32, and an inner bracing plate 36 contoured to fit around the associated wheel well and connected in tri-pod fashion with leg 32 to provide a three-point support unit. Fastening plates 34 are bolted to the frame of the pickup truck and bracing plate 36 is bolted to the wheel well.

Trailer hitch 20 also has a transverse bridging or cross member 40 pivotally connected to support structure 22 to pivot about a first or primary pivot axis 42. Cross member 40 extends across, and is suspended above, truck bed 16. Cross member 40 is preferably U-shaped (FIG. 3) having a mid-section 44, a first or left end 46, and a second or right end 48. Ends 46 and 48 have respective rocker shafts or pins 50 and 52 that are coaxially aligned along first pivot axis 42 and pivotally coupled to respective first and second mounting brackets 24 and 28. Complementary collars or pin supports sized to receive pins 50 and 52 are provided centrally of mounting brackets 24 and 26 above the wheel wells.

Mid-section 44 is suspended between first and second ends 46 and 48 and is radially spaced from first pivot axis 42 by a distance R to define the "U" shape. Mid-section 44 rotates about axis 42 to accommodate vertical up and down fluctuations of the trailer relative to the truck. Mid-section 44 comprises a pair of horizontal beams 54 and 56 and opposing pairs of angled beams 58 and 60 that interconnect the horizontal beams to the cross member ends.

Trailer hitch 20 also has a coupling subassembly 70 for connecting with a towing member of a trailer. Coupling subassembly 70 has a coupler head 72 and a head pivot mount 74 for permitting the coupler head to pivot back and forth about a second axis 76 as indicated by arrow 78 (FIG. 3). Pivot mount 74 is located at the longitudinal center of the mid-section 44 of U-shaped cross member 40 and is preferably aligned thereon such that first and second axes 42 and 76 are substantially perpendicular to one another. In this manner, head pivot mount 74 and cross member 40 form a gimbal means for supporting the coupler head 72 and for providing multi-directional pivoting capabilities about two different axes 42 and 76. This aspect of the invention is advantageous because it affords tremendous flexibility in that the trailer can move up and down relative to the truck due to pivoting cross member 40 and can also move laterally from side to side relative to the truck due to this head pivot mount 74. One benefit of this feature is that it facilitates connection and disconnection of the trailer to the truck on uneven ground where, for example, the trailer is tilted or angled differently than the truck. Due to the multi-directional gimbal arrangement, the towing pin can be dislodged from the couple head regardless of the pin's orientation. This multi-directional pivoting is an improvement over prior art single pivot arrangements.

In the preferred embodiment, coupler head 72 is a fifth-wheel trailer mount having a connecting plate with a relatively flat upper surface 80 for supporting a nose of a fifth-wheel trailer and a clamping mechanism for releasibly retaining the towing pin of the trailer. The clamping mechanism is of conventional design. It has a central slot 82 and locking jaws that are actuatable by handle 84 between an open position for receiving or releasing the towing pin and a closed position for clamping onto the towing pin and retaining it within slot 82. When locked in the slot, the towing pin is aligned along vertical pin axis 86, and the trailer pivots about this axis when cornering or parking. The clamping mechanism is not be described in detail and for purposes of clarity, is not shown in the drawings.

Pivot mount 74 is preferably comprised of an inner cylindrical tube and a cooperating outer, concentric collar or tube that are aligned along axis 76. The inner and outer tubes are rotatable relative to one another. In one configuration, the inner tube is fixedly mounted to U-shaped cross member 40 and the outer collar or tube is rotatable relative thereto, with the coupler head being fixed to the outer tube. Alternatively, the outer collar or tube is fixed to the cross member and the inner tube is coupled to the coupler head.

The "U" shape of cross member 40 is advantageous in that it supports the coupling subassembly 70 in approximate alignment with cross member ends 46 and 48 along primary axis 42. More specifically, cross member 40 is sized so that upper surface 80 of fifth-wheel connecting plate 72 is approximately elevationally level with, or is in approximately the same plane as, outer ends 46, 48 and axis 42. In this manner, the towing pin is held within the coupler head at approximately center of an intersection of the first pivot axis 42 and vertical pin axis 86 defined by the towing pin, thereby enhancing hitch stability. Distance R (the radial distance that mid-section 44 is spaced from axis 42) is thus selected to accommodate the width of the coupling assembly to effectuate the desired level relationship. The "U" shape design is beneficial for a "rail"-type hitch because it allows the cross-member to be suspended between the rail brackets, but due to the U-shape, the hitch supports the trailer load evenly and stably.

In compliance with the statute, the invention has been described in language necessarily limited in its ability to properly convey the conceptual nature of the invention. Because of this inherent limitation of language, it must be understood that the invention is not necessarily limited to the specific features shown and described, since the means herein disclosed comprise merely preferred forms of putting the invention into effect. The invention is, therefore, claimed in any of its forms or modifications within the proper scope of the appended claims appropriately interpreted in accordance with the doctrine of equivalents.

We claim:

1. A trailer hitch comprising:
   a support structure having first and second end mounting brackets spaced apart from one another;
   a U-shaped cross member pivotally mounted to the support structure to pivot about a first axis, the U-shaped cross member having (1) first and second ends aligned along the first axis and pivotally coupled to respective first and second mounting brackets and (2) a mid-section suspended between the first and second ends and radially spaced from, and rotatable about, the first axis;
   a coupling subassembly for connecting with a towing member of a trailer, the coupling subassembly being pivotally mounted to the mid-section of the U-shaped cross member to pivot about a second axis, the coupling subassembly comprising a fifth-wheel trailer mount having a connecting plate with an upper surface for supporting a nose of a trailer and a clamping mechanism for releasibly retaining a towing pin of the trailer; and
   the mid-section of the U-shaped cross member being radially spaced from the first axis an effective distance that at least a portion of the upper surface of the connecting plate is substantially elevationally level with the first and second ends of the U-shaped cross member.

2. A trailer hitch according to claim 1 wherein the first and second axes are substantially perpendicular.

3. A trailer hitch according to claim 1 wherein the coupling subassembly is pivotally mounted to the longitudinal center of the U-shaped cross member.

4. A trailer hitch according to claim 1 wherein the support structure is configured to mount to a truck bed having wheel wells, the first and second mounting brackets being fixedly connected to the truck and positioned over associated wheel wells such that the U-shaped cross member extends between the wheel wells and is suspended above the truck bed.

5. A trailer hitch assembly for use with support mounts provided on a vehicle, the trailer hitch assembly comprising:
   a U-shaped cross member adapted for pivotal connection to the support mounts to pivot about a first axis, the U-shaped cross member having (1) first and second ends aligned along the first axis and (2) a mid-section extending between the first and second ends and radially spaced from the first axis;
   a coupling subassembly for connecting with a towing member of a trailer, the coupling subassembly having an upper surface for supporting a nose of the trailer, the coupling subassembly being pivotally mounted to the mid-section of the U-shaped cross member to pivot about a second axis; and
   the mid-section of the U-shaped cross member being radially spaced from the first axis an effective distance that at least a portion of the upper surface of the connecting plate is substantially elevationally level with the first and second ends of the U-shaped cross member.

6. A trailer hitch assembly according to claim 5 wherein the first and second axes are substantially perpendicular.

7. A fifth-wheel trailer hitch comprising:
- a support structure having first and second end mounting brackets spaced apart from one another;
- a U-shaped cross member pivotally mounted to the support structure to pivot about a first axis, the U-shaped cross member having (1) first and second ends aligned along the first axis and pivotally coupled to respective first and second mounting brackets and (2) a mid-section suspended between the first and second ends and radially spaced from, and rotatable about, the first axis;
- a coupling subassembly for coupling with a cooperating towing pin of a trailer, the coupling subassembly being pivotally mounted to the mid-section of the U-shaped cross member to pivot about a second axis that is substantially perpendicular to the first axis;
- the coupling subassembly having a connecting plate with an upper surface for supporting a nose of the trailer and a clamping mechanism for releasably retaining the towing pin of the trailer; and
- the mid-section of the U-shaped cross member being radially spaced from the first axis an effective distance that at least a portion of the upper surface of the connecting plate is substantially elevationally level with the first and second ends of the U-shaped cross member.

8. A fifth-wheel trailer hitch according to claim 7 wherein the support structure is configured to mount to a truck bed having wheel wells, the first and second mounting brackets being fixedly connected to the truck and positioned over associated wheel wells such that the U-shaped cross member extends between the wheel wells and is suspended above the truck bed.

9. A fifth-wheel trailer hitch according to claim 7 wherein the coupling subassembly is pivotally mounted to the longitudinal center of the U-shaped cross member.

10. A fifth-wheel trailer hitch comprising:
- a support structure configured to mount to a truck bed having wheel wells, the support structure having a first end mounting bracket fixedly connected to the truck and positioned over an associated first wheel well and a second end mounting bracket fixedly connected to the truck and positioned over an associated second wheel well;
- a U-shaped cross member pivotally mounted to the support structure to pivot about a first axis, the U-shaped cross member having (1) first and second ends aligned along the first axis and pivotally coupled to respective first and second mounting brackets and (2) a mid-section suspended between the first and second ends and supported between the wheel wells, the mid-section being radially spaced from, and rotatable about, the first axis;
- a coupling subassembly for releasibly retaining a cooperating towing pin of a trailer, the coupling subassembly being pivotally mounted to the mid-section of the cross member to pivot about a second axis that is substantially perpendicular to the first axis;
- the coupling subassembly having a connecting plate with an upper surface for supporting a nose of the trailer and a clamping mechanism for releasibly holding the towing pin of the trailer; and
- the mid-section of the U-shaped cross member being radially spaced an effective distance from the first axis that at least a portion of the upper surface of the connecting plate is substantially elevationally level with the first and second ends of the U-shaped cross member.

11. A fifth-wheel trailer hitch according to claim 10 wherein:
- the coupling subassembly is pivotally mounted to the longitudinal center of the U-shaped cross member.

* * * * *